(12) United States Patent
Knutson et al.

(10) Patent No.: US 6,470,005 B1
(45) Date of Patent: Oct. 22, 2002

(54) TRANSCEIVER PREROTATION BASED ON CARRIER OFFSET

(75) Inventors: Paul Gothard Knutson, Marion; Kumar Ramaswamy, Indianapolis; Dong-Chang Shiue, Carmel, all of IN (US)

(73) Assignee: Thomson Licensing SA, Boulogne Cedex (FR)

( * ) Notice: Subject to any disclaimer, the term of this patent is extended or adjusted under 35 U.S.C. 154(b) by 0 days.

(21) Appl. No.: 09/222,389

(22) Filed: Dec. 29, 1998

(51) Int. Cl.⁷ ............................................. H04B 7/212
(52) U.S. Cl. ...................................... 370/347; 375/219
(58) Field of Search ................................ 370/347, 348, 370/328, 336, 337, 431, 442, 443, 335, 465, 320, 329, 468, 441; 375/140, 146, 147, 354

(56) References Cited

U.S. PATENT DOCUMENTS 6,215,778 B1 * 4/2001 Lomp ......................... 370/335
6,222,878 B1 * 4/2001 McCallister ................. 375/225

* cited by examiner

Primary Examiner—Douglas Olms
Assistant Examiner—Ricardo M. Pizarro
(74) Attorney, Agent, or Firm—Joseph S. Tripoli; Harvey D. Fried; Joseph J. Kolodka

(57) ABSTRACT

A wireless telephone system having a plurality of wireless handsets and a base unit, the base unit having a base transceiver. Each handset has a handset transceiver for establishing a wireless link over a shared channel with the base unit via the base transceiver, wherein the base transceiver transmits to a given handset transceiver a forward signal at a carrier frequency. Each handset transceiver has a receiver having a carrier tracking loop for detecting and removing a carrier offset from the forward signal; a transmitter for transmitting to the base transceiver a return signal; and an oscillator, independent of a base oscillator of the base transceiver on which the carrier frequency is based, for driving the receiver and transmitter of the handset. The handset transmitter comprises a prerotator that prerotates the return signal in accordance with the carrier offset detected by the carrier tracking loop so that the return signal will be received by the base transceiver with substantially no carrier offset.

16 Claims, 3 Drawing Sheets

TRANSCEIVER PREROTATION BASED ON CARRIER OFFSET

FIELD OF THE INVENTION

The present invention relates to digital signal processing systems and, in particular, to communications between transceivers having independent oscillators.

BACKGROUND OF THE INVENTION

Digital data transmission from a transmitter to a receiver requires a variety of digital signal processing techniques to allow the data to be transmitted by the transmitter and successfully recovered by the receiver. In digital wireless telephone systems, a wireless telephone handset unit communicates via digital radio signals with a base unit, which is typically connected via a standard telephone line to an external telephone network. In this manner, a user may employ the wireless handset to engage in a telephone call with another user through the base unit and the telephone network.

Multi-line wireless telephone systems are in use in various situations, such as businesses with many telephone users. Such systems employ a handset that communicates with up to N handsets simultaneously, typically with digital communications schemes, such as a spread-spectrum, time division multiple access (TDMA). In a spread spectrum system, bandwidth resources are traded for performance gains, in accordance with the so-called Shannon theory. The advantages of a spread-spectrum system include low power spectral density, improved narrowband interference rejection, built-in selective addressing capability (with code selection), and inherent channel multiple access capability. Spread-spectrum systems employ a variety of techniques, including direct sequencing (DS), frequency hopping (FH), chirp systems, and hybrid DS/FH systems.

In a TDMA system, a single RF channel is used, and each handset transmits and receives audio data packets as well as non-audio data packets during dedicated time slices or slots within an overall TDMA cycle or epoch. Other communications schemes include frequency division multiple access (FDMA), code division multiplexing/multiple access (CDM/CDMA), and combinations of such schemes, both full and half duplex. Various modulation schemes are employed, such as carrierless amplitude/phase (CAP) and quadrature amplitude modulation (QAM).

Such digital data is often transmitted as modulated signals over a transmission medium, such as the RF channel, in the form of binary bits of data. (Other transmission media often used for digital communications include twisted-pair systems employing asymmetric digital subscriber loop (ADSL) technology or cable modem systems.) The digital data is often modulated and transmitted in complex digital data form, in which the transmitted data comprises symbols from which the original data can be reconstructed by the receiver. Complex digital symbol data typically comprises real (in-phase, or "I") data, and imaginary (quadrature, or "Q") data (I, Q pairs). Each symbol of an I,Q pair may be a multi-bit number, and represent a location of a constellation, mapped against a decision region such as a quadrant. Each symbol is mapped or assigned to a prescribed coordinate in a four-quadrant grid-like constellation using a look-up table (e.g., a ROM). A prescribed number of symbols occupy assigned areas in each quadrant, depending on the encoding scheme. Depending on the number of bits/symbol of a given encoding scheme, each quadrant of the constellation contains a number of symbols at prescribed coordinates with respect to quadrature I and Q axes. For example, in the QPSK encoding scheme, each sample has one of four phase positions, one for each quadrant, so that each symbol pair represents two bits of data.

To transmit a given input data value in a complex data system, the input data value to be transmitted is mapped to a symbol pair or pair of coordinates I,Q of a corresponding constellation point on a complex signal constellation having real and imaginary axes I and Q. These I,Q symbols, which represent the original data value, are then transmitted as part of data packets by a modulated channel. A receiver can recover the I,Q pairs and determine the constellation location therefrom, and perform a reverse-mapping to provide the original input data value or a close approximation thereof.

In a spread spectrum system, each symbol is transmitted by a string of "sub-symbols" or "chips", derived by multiplying the symbol times a pseudo-random number (PN) binary string. Such systems are thus characterized by a chip rate, which is related to the symbol rate by a so-called spread factor (a factor by which the original symbol data rate has been expanded). Spread spectrum systems may also be used, in general, to transmit any digital data, whether in complex format or not.

As noted above, digital data transmission requires a variety of digital signal processing techniques to allow the data to be transmitted by the transmitter and successfully recovered by the receiver. For example, a communications link must first be established, in which the two transceivers lock onto each other, establish synchronization and other system parameters, and the like. The receiver side of a data transmission in a spread-spectrum digital wireless telephone systems employs a variety of functions to recover data from a transmitted RF signal. These functions can include: timing recovery for symbol synchronization, carrier recovery (frequency demodulation), equalization, and gain control. The receiver includes symbol timing recovery (STR), automatic gain control (AGC), carrier tracking loops (CTL), and equalizer loops for each link. Timing recovery is the process by which the receiver clock (timebase) is synchronized to the transmitter clock. This permits the received signal to be sampled at the optimum point in time to reduce the chance of a slicing error associated with decision-directed processing of received symbol values. In some receivers, the received signal is sampled at a multitude of the transmitter symbol rate. For example, some receivers sample the received signal at twice the transmitter symbol rate. In any event, the sampling clock of the receiver must be synchronized to the symbol clock of the transmitter.

Equalization is a process which compensates for the effects of transmission channel disturbances upon the received signal. More specifically, equalization removes intersymbol interference (ISI) caused by transmission channel disturbances. ISI causes the value of a given symbol to be distorted by the values of preceding and following symbols. Carrier recovery is the process by which a received RF signal, after being frequency shifted to a lower intermediate passband, is frequency shifted to baseband to permit recovery of the modulating baseband information. These and related functions, and related modulation schemes and systems, are discussed in greater detail in Edward A. Lee & David G. Messerschmitt, Digital Communication, 2d ed. (Boston: Kluwer Academic Publishers, 1994).

Because each transceiver operates on an independent oscillator, even if the frequencies are the same, the signal transmitted by one receiver is typically received with a "spinning" constellation, i.e. a carrier frequency offset, which is detected and accounted for by the CTL. Thus, when one transceiver transmits at a given carrier frequency in accordance with its local oscillator, the receiving transceiver's CTL downconverts to the lower passband and digitally removes the residual carrier offset. Thereafter the receiving transceiver is able to regenerate the data stream embedded in the transmitted signal. Of course, when the second transceiver transmits data back to the first transceiver, the first transceiver must also apply a CTL to remove the residual carrier offset.

During initial locking to establish a link, this process can delay acquisition of a locked link, at both ends. Once these carrier offsets are known by both transceivers after the link it initially established, subsequent communications are not delayed as much since each receiver side can begin the acquisition using the last carrier offset recovered. However, the initial link process can be delayed due to each transceiver having independent oscillators. In addition, in a multi-line wireless telephone system employing a base unit and a plurality of handsets, each having a transceiver with an independent oscillator, such as a TDMA system, even after the initial links are established, in order to avoid having to re-determine the correct carrier offset for each separate handset when its slot occurs and thus delaying the acquisition thereof, the base must store and keep track of the carrier offsets for each of a plurality of links. This storing and tracking can be complex, expensive, cause delays, or otherwise be undesirable, yet without it acquisition delay increases.

SUMMARY

A wireless telephone system having a plurality of wireless handsets and a base unit, the base unit having a base transceiver. Each handset has a handset transceiver for establishing a wireless link over a shared channel with the base unit via the base transceiver, wherein the base transceiver transmits to a given handset transceiver a forward signal at a carrier frequency. Because the base and each handset transceiver operate on independent oscillators, each handset transceiver receives the forward signal having a carrier offset. Each handset transceiver has a receiver having a carrier tracking loop for detecting and removing the carrier offset from the forward signal; a transmitter for transmitting to the base transceiver a return signal; and an oscillator, independent of a base oscillator of the base transceiver on which the carrier frequency is based, for driving the receiver and transmitter of the handset. The handset transmitter comprises a prerotator that prerotates the return signal in accordance with the carrier offset detected by the carrier tracking loop so that the return signal will be received by the base transceiver with substantially no carrier offset

DESCRIPTION OF THE PREFERRED EMBODIMENT

In the present invention, the transceiver transmitter of each handset of a multi-line wireless telephone system includes a prerotator that prerotates the signal transmitted to the base unit of the system, in accordance with the carrier offset determined by the CTL of the transceiver receiver. This ensures that the signal received by the base unit's receiver from each handset during, for example, respective time slots of a TDMA epoch, is received with virtually no carrier offset (or rotation), thereby speeding acquisition by the base unit, and also eliminating the need for the base unit to store and track the carrier offsets of each separate handset. These and other details and advantages of the present invention are described in further detail below.

Figure 1:
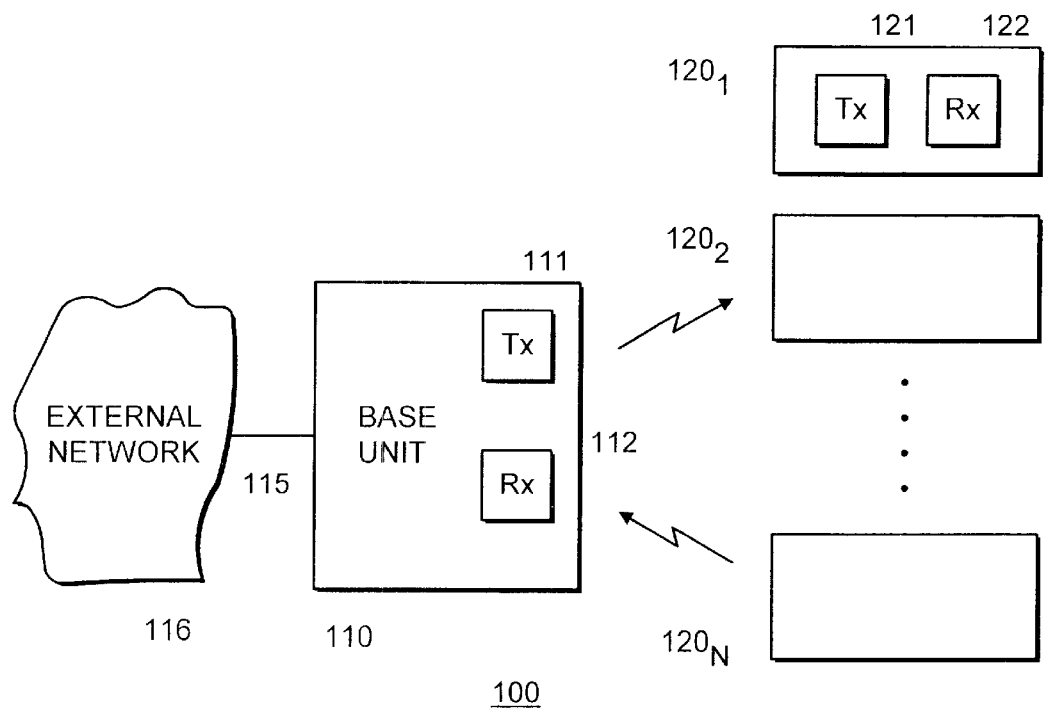
FIG. 1 is a block diagram of spread spectrum TDMA multi-line wireless telephone system, in accordance with an embodiment of the present invention.

Referring now to FIG. 1, there is shown a block diagram of TDMA multi-line wireless telephone system 100, in accordance with an embodiment of the present invention. TDMA system 100 comprises a base unit 110, which has receiver and transmitter units 112 and 111, respectively, and is coupled to external telephone network 116 via telephone line(s) 115. System 100 also comprises N wireless handsets $120_1, 120_2, \ldots 120_n$, Each has a transmitter and receiver unit (transceiver), such as transmitter 121 and receiver 122 of handset $120_1$. At any given time, some number (or none) of the handsets are operating or off hook (i.e., in the process of conducting a telephone call). System 100 thus provides a wireless network or link between the base station 110 and each handset $120_i$ ($1 \leq i \leq N$). In one embodiment, system 100 comprises 4 handsets $120_1$–$120_4$, all of which may be active simultaneously. In another embodiment, system 100 comprises a different number of handsets, e.g., N=12, of which, for example, up to 8 can be active or operational at a time.

Each transmitter 121 modulates and transmits modulated signals. A variety of digital modulation formats may be employed in such systems, including: QAM, CAP, PSK (phase shift keying), PAM (pulse amplitude modulation), VSB (vestigial sideband modulation), FSK (frequency shift keying), OFDM (orthogonal frequency division multiplexing), and DMT (discrete multitone modulation).

In one embodiment, the present invention comprises a TDMA system for connecting multiple transceivers to a base station over a single RF channel. In particular, system 100 employs a digital TDMA scheme, as described in further detail below.

Figure 2:
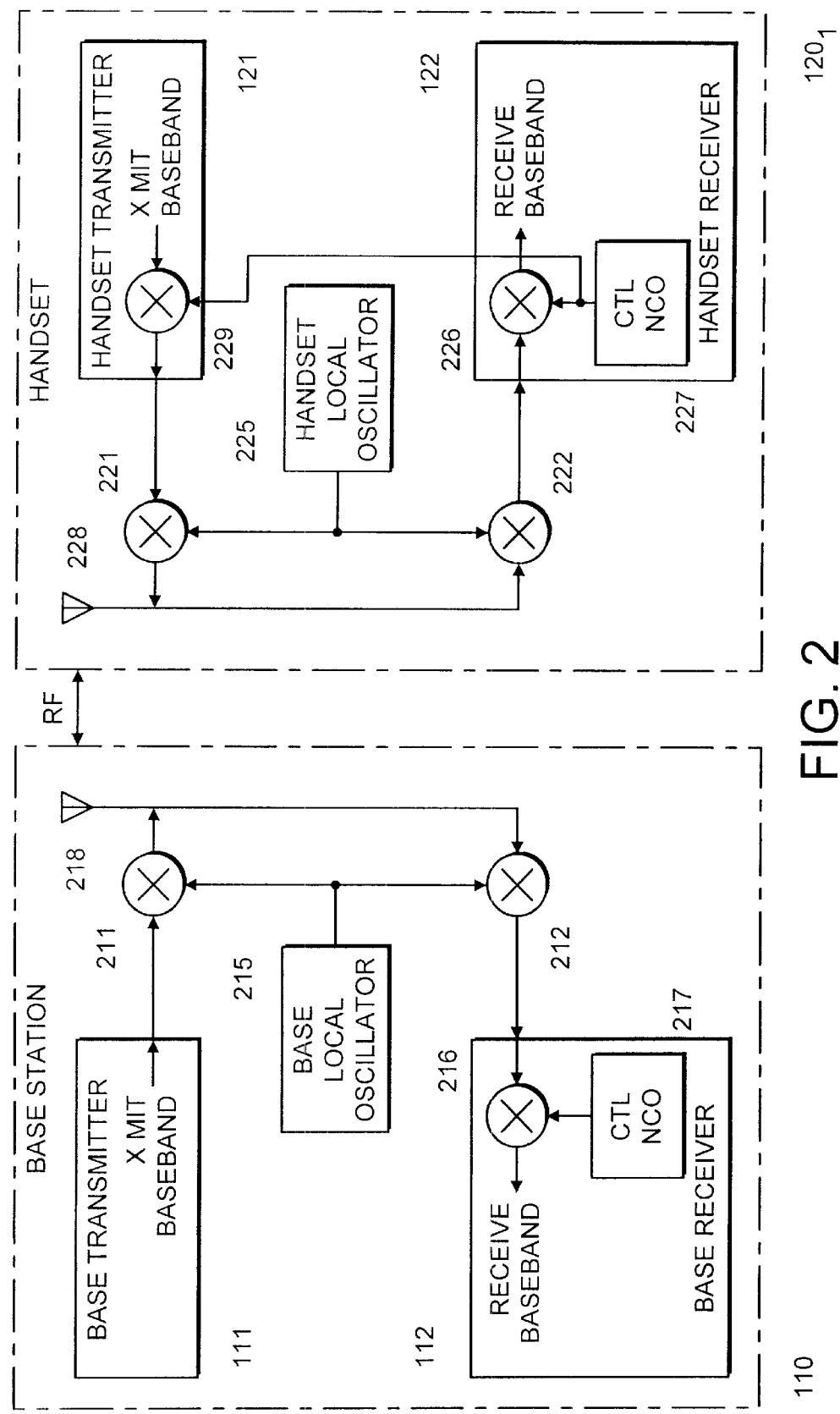
FIG. 2 is a block diagram illustrating the system of FIG. I and the handset transmitter prerotator in further detail, in accordance with an embodiment of the present invention.

Referring now to FIG. 2, there is shown a block diagram illustrating system 100 of FIG. 1 and an exemplary handset transmitter prerotator in further detail, in accordance with an embodiment of the present invention. FIG. 2 shows, for illustrative purposes, the prerotator details of transmitter 111 and receiver 112 of base unit 110, and of transmitter 121 and receiver 122 of handset $121_1$. In particular, base unit 110 comprises base local oscillator 215, which serves as a common oscillator to drive both upconverter 211 and downconverter 212, i.e. both forward and return channels. A signal or data message transmitted from the base unit to a handset may be referred to as a forward signal, and a signal or data message transmitted from a handset to the base unit may be referred to as a return signal. Base receiver 112 also comprises derotator 216, and CTL/numerically-controlled oscillator (NCO) 217. Upconverter 211 transmits an RF signal via antenna 218, while downconverter 222 receives RF signals via antenna 218.

Handset $120_1$ comprises handset local oscillator 225, which serves as a common oscillator to drive both upconverter 221 and downconverter 222. Handset receiver 122 also comprises derotator 226 and CTL/NCO 227. Upconverter 221 transmits RF signals to base unit 110 via antenna 228, while downconverter 222 receives RF signals from base unit 210 via antenna 228. In accordance with an embodiment of the present invention, handset transmitter 121 also comprises handset transmitter prerotator 229, which is coupled to handset receiver CTL/NCO 227 to receive the carrier offset information therefrom. As will be appreciated, each handset $120_2$–$120_N$ is configured similarly to $120_1$ with a handset transmitter prerotator such as prerotator 229. Thus, during initial acquisition of a link between base unit 110 and any given handset such as handset $120_1$, base unit 110 transmits a data packet in the "downlink", which is locked on to by handset receiver 122. This signal transmitted by base unit 110 has a certain carrier offset or rotation because its local oscillator 215 is independent of handset local oscillator 225. Handset receiver CTL/NCO 227 detects the carrier offset and digitally removes it with derotator 226. The same carrier offset detected is also used by handset transmitter prerotator 229 to perform an inverse rotation on the "return channel link" or "uplink" sent back to base unit 110. In other words, the "return" channel is prerotated with a rotation that is the inverse of the rotation detected and removed from the "forward" channel. Thus, base receiver 112 receives the signal from handset transmitter 121 with virtually no rotation, thus speeding acquisition of the signal. Thus, base receiver 112 can lock onto the return channel more easily because of the prerotation thereof, and only need track phase errors, since the frequency errors were removed at the handset.

Subsequently, once the link has been established, handset transmitter 121 continues to prerotate the transmitted signal with prerotator 229, thereby eliminating the need for base unit 110 to store and track the carrier offsets of each separate handset $120_1$–$120_N$. In one embodiment, prerotator 229 comprises an NCO which can prerotate the return channel in accordance with the last carrier frequency offset used in handset receiver 122.

Thus, in the present invention, one transceiver such as a handset measures various forward channel parameters, including carrier offset, and uses these parameters to precompensate the return channel signal to improve functioning and operation of the return channel receiver.

In an alternative embodiment, base transmitter 11I also includes a prerotator, which, although it does not speed initial link acquisition as do the use of handset transmitter prerotators 229, does eliminate the need for handset receiver 122 to store and track the carrier offset of base unit 110.

One skilled in the art will recognize that the wireless system described above according to the principles of the invention may be a cellular system where base unit 110 represents a base station serving one of the cells in a cellular telephone network.

In addition to digital communications of a wireless telephone system as described hereinabove, the present invention is also applicable to BPSK, QPSK, CAP and QAM, for example, as well as to VSB modulation systems such as employed by the Grand Alliance High Definition Television (HDTV) system proposed for use in the United States. One skilled in the art will recognize what design changes are required to adapt the disclosed transmitter modulation system to the desired modulation scheme, and will understand how to design the illustrated components to operate with the desired modulation scheme.

Figure 3:
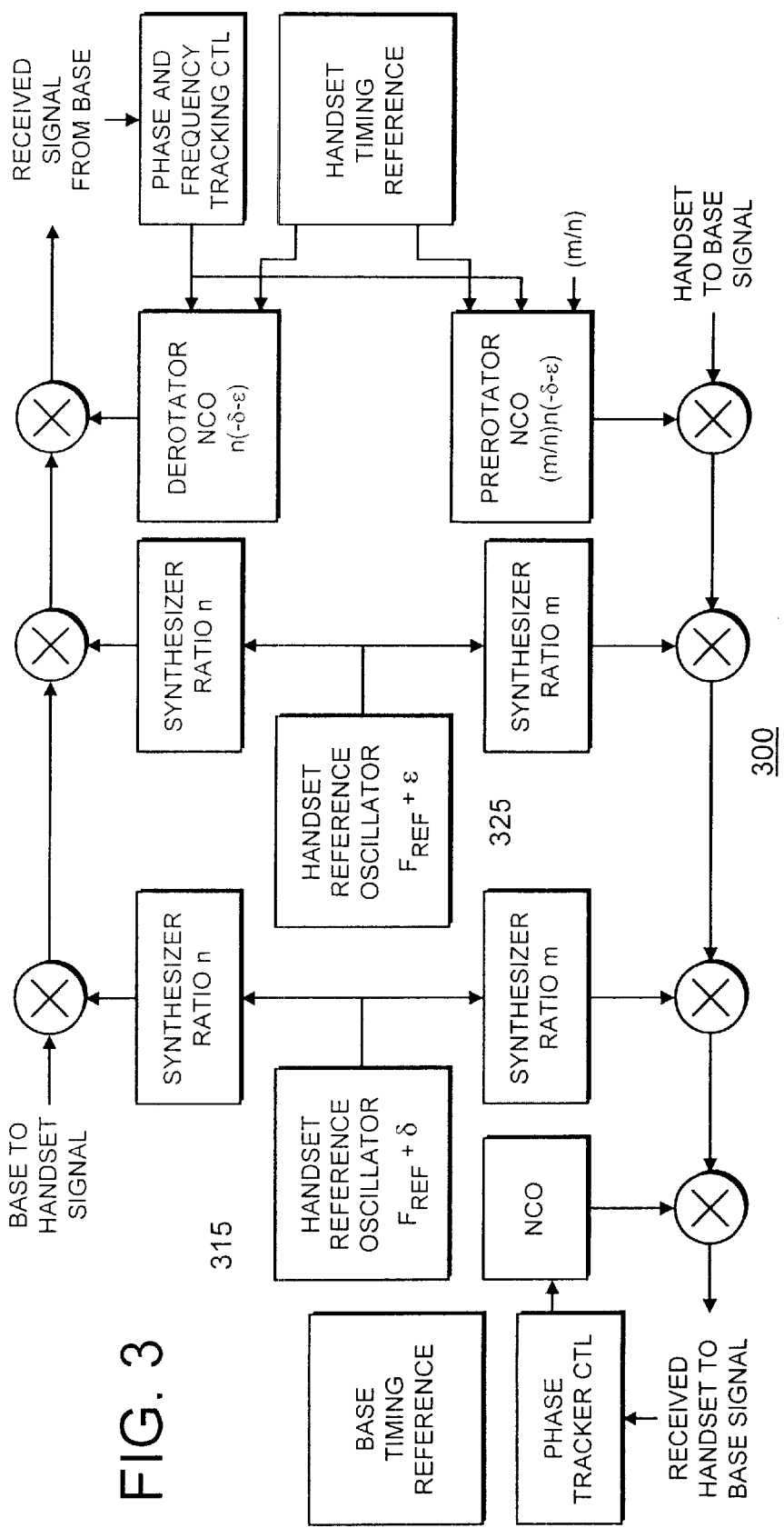
FIG. 3 is a block diagram of an FDMA multi-line wireless telephone system, in accordance with an alternative embodiment of the present invention.

In addition to implementing the present invention in a TDMA system, in alternative embodiments, the present invention is also applicable to other systems such as FDMA, CDM/CDMA, and combinations of such schemes, both full and half duplex. For example, referring now to FIG. 3, there is shown a block diagram of an FDMA multi-line wireless telephone system 300, in accordance with an alternative embodiment of the present invention. When different RF channels are used, identical oscillators will not always be used. If, however, as in FDMA system 300, the forward and return channel oscillators (synthesizers) are locked to a common reference oscillator in both base and handset (oscillators 315, 325), then the frequency error is a function of the synthesizer ratios. Full duplex operation is also possible in this case. In such a system, only one receiver is required to cancel carrier frequency deviation; therefore, to implement the present invention in such an FDMA system, one link take the lead to acquire the channel, and the other link direction would lock quickly, since the carrier frequency deviation would be removed, as will be appreciated by those skilled in the art.

Those skilled in the art will also appreciate how to apply the present invention to other systems such as CDM/CDMA. For example, in a CDM/CDMA system, full duplex operation is possible, since both channels can be operating concurrently in the same band. In implementing the present invention to a CDM/CDMA system, therefore, one link (base to handset, for example) is preferably locked before the opposing link. Once the base to handset link is established, the carrier offset is measured and used in the return link. Using a prerotator distributes the complexity of the system more evenly between base and handsets.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A first transceiver for communicating with a second transceiver that transmits to the first transceiver a forward signal, the first transceiver comprising:
   (a) a receiver having a carrier tracking loop for detecting and removing a carrier offset from the forward signal;
   (b) a transmitter for transmitting to the second transceiver a return signal; and
   (c) an oscillator, independent of a second oscillator of the second transceiver on which a carrier frequency is based, for driving the receiver and transmitter, wherein the transmitter comprises a prerotator that prerotates the return signal in accordance with the carrier offset detected by the carrier tracking loop so that the return signal will be received by the second transceiver with substantially no carrier offset.

2. The first transceiver of claim 1, wherein:
   the forward signal represents successive symbols at a first symbol rate; and
   the receiver is for receiving samples representing the forward signal.

3. The first transceiver of claim 1, wherein:
   the first transceiver is a handset transceiver of a first wireless handset;
   the second transceiver is a base transceiver of a base unit;
   the first wireless handset and the base unit are part of a wireless telephone system further comprising a plurality of other wireless handsets, each handset comprising a handset transceiver for establishing a wireless link over a shared channel with the base unit via the base transceiver.

4. The first transceiver of claim 3, wherein the wireless link is a time-division multiple access (TDMA) link, in which each handset communicates during an exclusive time slot of a TDMA scheme that allocates time slots to handsets.

5. The first transceiver of claim 3, wherein the wireless telephone system is a spread spectrum system in which each successive symbol is a chip of a binary spread spectrum chip sequence representing a complex symbol.

6. The first transceiver of claim 1, wherein the prerotator is coupled to an output of the carrier tracking loop for receiving the carrier offset detected by the carrier tracking loop.

7. The first transceiver of claim 1, wherein the forward signal comprises a downlink date packet transmitted by the second transceiver before a communications link is established; and the return signal comprises a return channel link data packet transmitted by the transceiver after the transceiver locks onto the forward signal.

8. In a first transceiver having a receiver with a carrier tracking loop, a transmitter, and an oscillator coupled to the receiver and transmitter, a method for communicating with a second transceiver that transmits to the first transceiver a forward signal at a carrier frequency, the method comprising the steps of:
   (a) driving the receiver and transmitter with the oscillator, wherein the oscillator is independent of a second oscillator of the second transceiver on which the carrier frequency is based;
   (b) receiving the forward signal with the receiver and detecting and removing, with the carrier tracking loop of the receiver, a carrier offset from the forward signal;
   (c) prerotating with a prerotator of the transmitter a return signal in accordance with the carrier offset detected by the carrier tracking loop so that the return signal will be received by the second transceiver with substantially no carrier offset; and
   (d) transmitting to the second transceiver the prerotated return signal.

9. The method of claim 8, wherein:
   the forward signal represents successive symbols at a first symbol rate; and
   step (b) comprises the step of receiving samples representing the forward signal.

10. The method of claim 8, wherein:
    the first transceiver is a handset transceiver of a first wireless handset;
    the second transceiver is a base transceiver of a base unit; and
    the first wireless handset and the base unit are part of a wireless telephone system further comprising a plurality of other wireless handsets, each handset comprising a handset transceiver for establishing a wireless link over a shared channel with the base unit via the base transceiver.

11. The method of claim 10, wherein the wireless link is a TDMA link, in which each handset communicates during an exclusive time slot of a TDMA scheme that allocates time slots to handsets.

12. The method of claim 8, wherein the forward signal comprises a downlink date packet transmitted b the second transceiver before a communications link is established; and the return signal comprises a return channel link date packet transmitted by the transceiver after the transceiver locks onto the forward signal.

13. A wireless telephone system, comprising:
   (a) a base unit having a base transceiver comprising a base oscillator; and
   (b) a plurality of wireless handsets, each handset comprising a handset transceiver for establishing a wireless link with the base unit, wherein the base unit transmits to the handset transceiver of a handset a forward signal at a carrier frequency, the handset transceiver comprising:
      (1) a receiver having a carrier tracking loop for detecting and removing a carrier offset from the forward signal;
      (2) a transmitter for transmitting to the base transceiver a return signal; and
      (3) an oscillator, independent of the base oscillator on which the carrier frequency is based, for driving the receiver and transmitter, wherein the transmitter comprises a prerotator that prerotates the return signal in accordance with the carrier offset detected by the carrier tracking loop so that the return signal will be received by the base transceiver with substantially no carrier offset.

14. The system of claim 13, wherein:
    the forward signal represents successive symbols at a first symbol rate; and
    step (b) comprises the step of receiving samples representing the forward signal.

15. The system of claim 13, wherein each wireless link is a TDMA link, in which each handset communicates during an exclusive time slot of a TDMA scheme that allocates time slots to handsets.

16. The system of claim 13, wherein the forward signal comprises a downlink data packet transmitted by the second transceiver before a communications link is established; and the return signal comprises a return channel link data packet transmitted by the transceiver after the transceiver locks onto the forward signal.

* * * * *